United States Patent [19]

Greenlee et al.

[11] 3,903,501

[45] Sept. 2, 1975

[54] AIRCRAFT LIGHTING SYSTEM

[75] Inventors: Paul H. Greenlee, Urbana; Erasmus W. Morgan, Fairborn, both of Ohio

[73] Assignee: Grimes Manufacturing Company, Urbana, Ohio

[22] Filed: Dec. 31, 1969

[21] Appl. No.: 889,521

[52] U.S. Cl. .................. 340/25; 307/293; 340/331
[51] Int. Cl.² .......................................... G08G 5/00
[58] Field of Search ............ 340/25, 83, 84, 87, 27; 315/241 S; 240/1.2,7.7; 9/8.3

[56] References Cited
UNITED STATES PATENTS

| | | | |
|---|---|---|---|
| 2,273,747 | 2/1942 | Adler, Jr. | 340/25 |
| 2,777,120 | 1/1957 | Madsen | 340/25 |
| 2,832,059 | 4/1958 | Adler, Jr. | 340/25 |
| 2,843,728 | 7/1958 | Roth et al. | 340/25 |
| 2,960,679 | 11/1960 | Atkins | 340/25 |
| 3,154,732 | 10/1964 | Jensen | 315/241 S |
| 3,533,059 | 10/1970 | Lambert | 340/25 |

*Primary Examiner*—Thomas B. Habecker
*Attorney, Agent, or Firm*—Biebel, French & Bugg

[57] ABSTRACT

An aircraft lighting system includes a pair of forwardly facing flash lamps on the wing tips which flash at the same repetition rate but wherein the flashing of one lamp is delayed by a predetermined time interval from the flashing of the other lamp to provide a distinctive flash pattern at the forward part of the aircraft to aid in a collision avoidance.

5 Claims, 7 Drawing Figures

AIRCRAFT LIGHTING SYSTEM

BACKGROUND OF THE INVENTION

The chance of collision between aircraft moving in the same air space is naturally increased as the aircraft approach each other since the closing rate is the sum of the speeds of the aircraft in the direction of closing. It is therefore important for pilots to see and recognize the direction of travel of other aircraft, especially those which are on a closing course, so that appropriate action may be taken to insure adequate separation between the aircraft.

There are many forms of aircraft lighting systems including colored lights and high intensity flash lamps for assisting in collision avoidance. One system utilizing flash lamps, disclosed in U.S. Pat. No. 2,960,679, divides the air space around the aircraft into several regions with the flashing rates of the lamps observed from a distance providing information regarding the relative position of the aircraft, and thus the relative danger of collision. Shields divide a plurality of flash lamps into the regions so that there is an abrupt change in the flashes per unit time observed when moving from one region to another. Thus, if the aircraft is approaching, a higher flash rate will be observed than when the aircraft is retreating from an observer.

SUMMARY OF THE INVENTION

This invention relates to a simplified aircraft anti-collision lighting system wherein the approach of the aircraft indicated by closely spaced double flashes from a pair of forwardly facing wing tip mounted lamps which are triggered and flashed at the same repetition rate but wherein the flashing of one lamp is delayed relative to the flashing of the other lamp. A rearwardly facing lamp is also provided to indicate the retreat of the aircraft, and this lamp also flashes at the same repetition rate and simultaneously with one of the forwardly facing lamps.

By delaying the firing of one of the forwardly facing lamps relative to the other, an observer is provided with a unique, distinct and distinguishing flash which immediately alerts him to the fact that the aircraft is approaching and therefore he may have to take some evasive action to avoid collision. It has been found that a double flash is more effective in bringing attention to a vehicle than lamps which are flashed at an even rate, even through this rate may be twice the repetition rate of the double flash system. Also, there is no confusion as to the direction of travel of the aircraft since the observer does not have to judge the rate of flashing but only has to determine if a single or double flash is observed. It has also been determined that the time delay between the lamps should be in the order of 175 milliseconds since a shorter delay tends to merge as a single flash.

The aircraft is also provided with red anti-collision flash lamps mounted on the body of the aircraft, and these lamps flash approximately midway in the time interval in the flashing of the wing tip lamps. Thus, all lamps on the aircraft flash at the same repetition rate, but not all at the same time.

This invention also relates to a unique and novel method for supplying power to the lamps and triggering the lamps into operation. In the preferred embodiment, power is supplied for a predetermined period of time during each cycle of operation from a timing circuit through controlling circuits located physically near the flash lamps which raise the voltage supplied by timing circuit and direct this voltage to energy storing capacitor banks mounted with each flash lamp. The controlling circuits sense when the power is interrupted from the timer and activate circuits which trigger the flash lamps. With respect to the forward facing flash lamps, one lamp is triggered 175 milliseconds after the other lamp to provide the distinguishing flash of light. All of the lamps flash during the interval when no power is supplied from the timing circuit thus preventing afterglow of the lamps. This arrangement also prevents momentary loading of the aircraft power supply system.

This invention also provides a fail safe device wherein the controlling circuit causes the lamps to continue to flash in the event power supplied to the controlling circuit is not interrupted by the timing circuit. Although under these conditions the lamps on one wing tip will flash independently and out of synchronism with the lamps on the other wing tip, nevertheless the lamps will flash to provide some indication as to the direction of travel of the aircraft thus insuring safety of flight even though some of the circuits might fail.

Accordingly, it is an object of this invention to provide an aircraft lighting system of the type described above wherein two forward facing lamps are flashed at the same repetition rate but wherein the flashing of one lamp is delayed relative to the flashing of the other lamp to provide a unique and distinguishing flash pattern which immediately alerts an observer of the approach of the aircraft; and to provide an improved aircraft anti-collision lighting system wherein each of the lamps used in the system are flashed at the same repetition rate under the control of a timing circuit and wherein the lamps can be fired independently in the event of failure of the timing circuit.

Other objects and advantages of the invention will be apparent from the following description, the accompanying drawings and the appended claims.

DESCRIPTION OF THE PREFERRED EMBODIMENT

Figure 1:
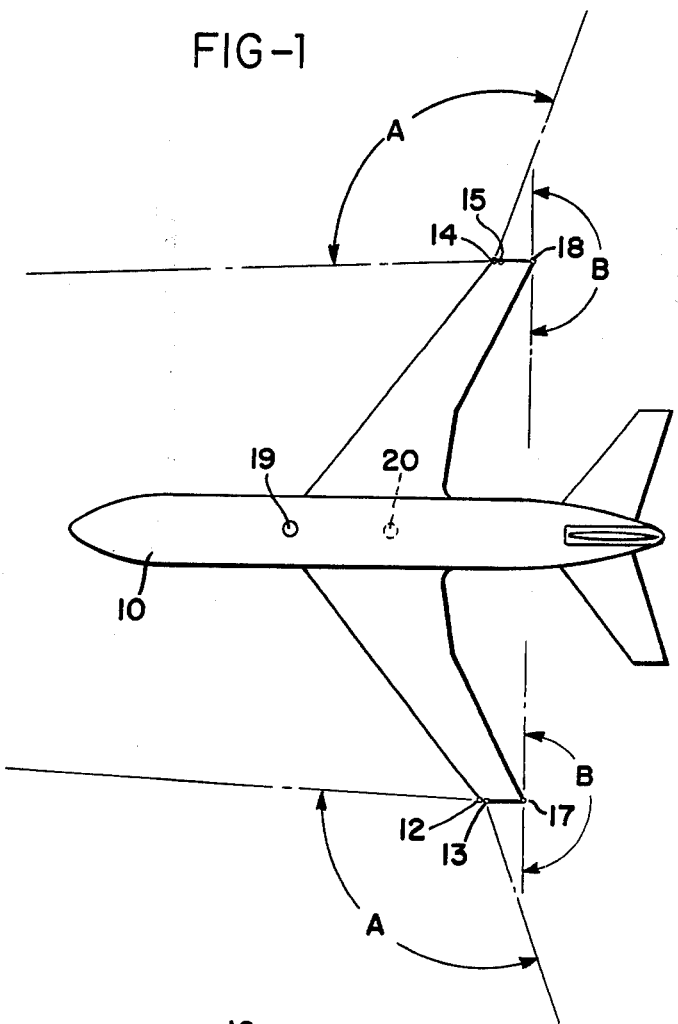
FIG. 1 is a plan view showing a typical aircraft and the location of the flash lamps employed in connection with this invention.

Referring now to the drawings, and particularly to FIG. 1, an aircraft 10 is provided with a plurality of high intensity flash lamps for the purpose of aiding in the identification and recognition of the aircraft while in flight. These high intensity flash lamps supplement the position lamps which are already required by Government regulations, such as the red and green lamps on the left and right wing tips, respectively, and the white lamp on the tail of the aircraft. A pair of forwardly facing flash lamps 12, 13 and 14, 15 are mounted on each wing tip. Rearwardly facing lamps 17 and 18 are mounted on the trailing edge of the wing tips. Red anti-collision lamps 19 and 20 are mounted on the upper and lower portion of the aircraft fuselage to assist further in identification and recognition.

The forwardly facing flash lamps 12, 13 and 14, 15 are so mounted on the wing tips so that they may be seen by an observer positioned anywhere in the arc A shown in FIG. 1. The rearwardly facing lamps 17 and 18 are so mounted that they may be observed through the arc labeled B. As will be explained, one of the lamps 12 or 13 is flashed simultaneously with the rearwardly facing lamp 17, and one of the lamps 14 or 15 is likewise flashed simultaneously with the rearwardly facing lamp 18. When viewing the aircraft from the side it is therefore possible to see all three wing tip flash lamps, however no confusion will result.

Figure 2:
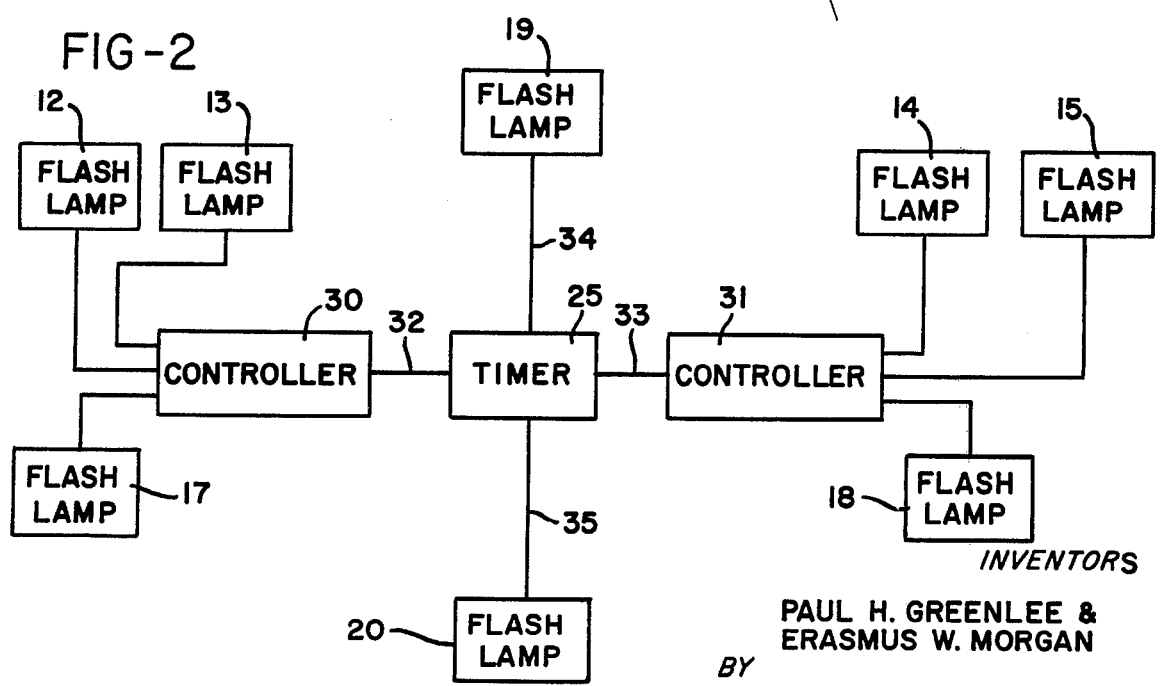
FIG. 2 is an electrical block diagram showing the relationship of the major components comprising this invention.

All of the flash lamps mounted on the aircraft are flashed under the control of timing circuit means 25, shown in FIG. 2. This timing circuit has four outputs, two of which are connected to the anti-collision lamps 19 and 20, and the other two are connected to controlling circuit means 30 and 31. For the purpose of explanation, only the operation of controlling means 30 will be described since the circuit 31 is identical in design and function.

Figure 3:
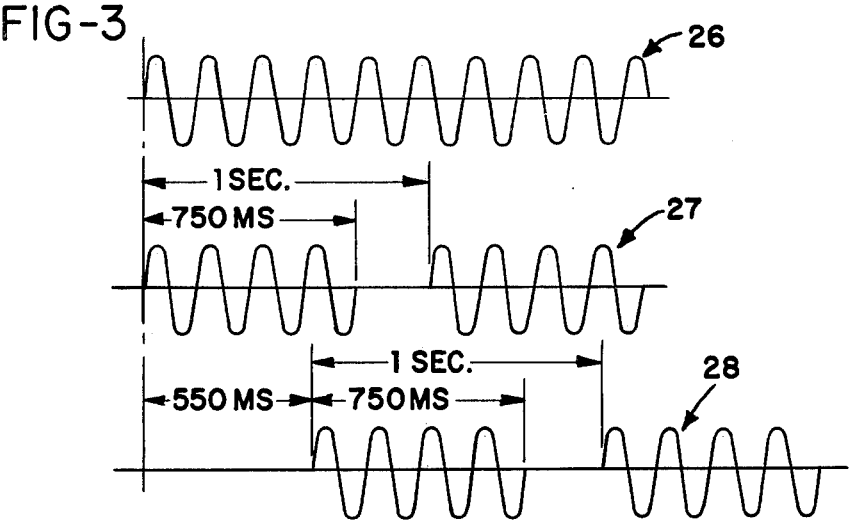
FIG. 3 is a set of wave forms showing the relationship between the power input to the timing circuit and the output voltage from the timing circuit to the controlling circuits.

Timing circuit means 25 is provided with 115 volt, 400 Hz from the aircraft power supply as illustrated by wave form 26 in FIG. 3. The outputs from the timing circuit means takes one two forms as illustrated by wave forms 27 and 28. Each output wave form is 750 milliseconds in duration and has a repetition rate of one second. Wave form 28 is delayed from wave form 27 by approximately 550 milliseconds. This delay is for the purpose of providing alternate flashing of both body mounted flash lamps 19 and 20 relative to the wing tip mounted flash lamps. This arrangement distributes the power requirements for the lamp flashing circuit more evenly with respect to time.

In the preferred embodiment of the invention, the lamps are only flashed during the interval when no power is supplied by the timing circuit means to the flash lamps so that the aircraft power supply will not be loaded by the flashing of these lamps and also to prevent after-glow of the lamps.

Referring again to FIG. 2, timing circuit means 25 115 volt, 400 Hz power through cables 32 and 33 to controllers 30 and 31, respectively, and through cables 34 and 35 to the body mounted flash lamps 19 and 20, respectively. The timing circuit means 25 is physically located centrally in the aircraft while the controlling circuit means and flash lamps are located in the wing tips or on the body and in unpressurized areas of the aircraft. Since cables 32–35 carry only relatively low voltages, radio frequency interference to other aircraft systems is reduced to a minimum.

Figure 4:
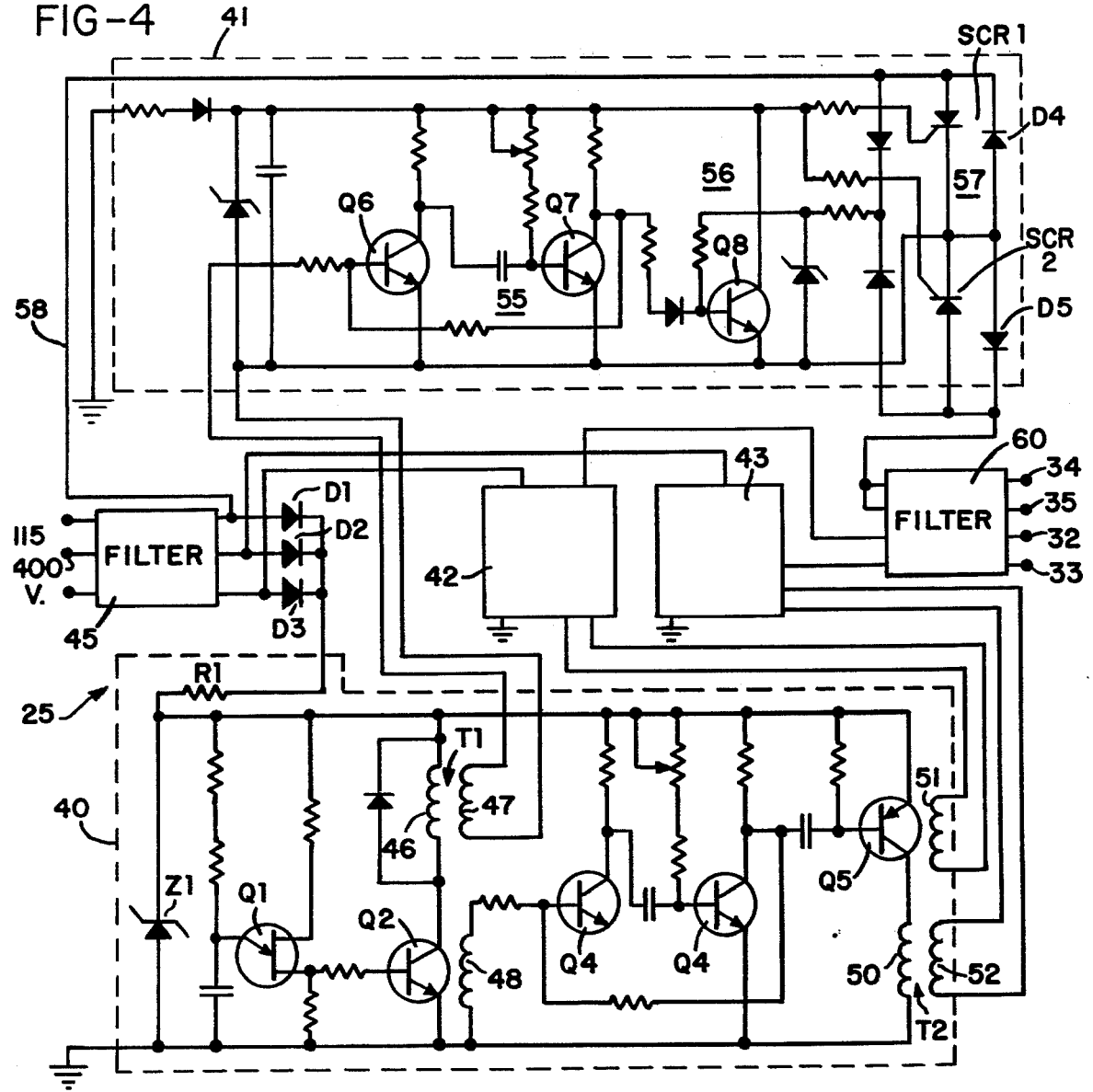
FIG. 4 is a detailed electrical schematic diagram of the timing circuit.

Referring now to FIG. 4, which is a detailed electrical schematic diagram of the timing circuit means, this circuit is made up of four separation parts, a main timer 40 and three power interrupting circuits 41, 42 and 43, with power interrupting circuit 41 being shown in detail. Power interrupting circuits 42 and 43 are identical to circuit 41 in function and circuit design.

Aircraft power is supplied to the timing circuit means 25 through a filter 45 which prevents any radio frequency interference which may be generated by the lamp flashing circuits from being impressed on the aircraft power supply and interfering with the aircraft radios. The input, which is 115 volts, 400 Hz, three phase, is applied through rectifying diodes D1, D2 and D3, which form a three phase half wave rectifier, and through resistor R1 to Zener diode Z1 in the timing circuit 40. Power from any one of the three phase inputs is sufficient to operate the timing circuit 40.

The timing circuit 40 includes a unijunction transistor Q1 which is connected to operate as an oscillator having a one second period. Each time transistor Q1 fires, it gates transistor Q2 and supplies a pulse of current in the primary winding 46 of transformer T1. Secondary winding 47 of transformer T1 is connected as an input to the first power interrupting circuit 41. The other secondary winding 48 of transformer T1 is connected to a monostable multivibrator which includes transistors Q3 and Q4. This monostable multivibrator is set to run for 550 milliseconds, and at the end of this time transistor Q5 is gated to develop a pulse in the primary winding 50 of transformer T2. This transformer has two secondary windings 51 and 52 which are connected to the remaining power interrupting circuits 42 and 43, respectively.

Thus, the timing circuit 40 provides an output to each of the power interrupting circuits which are spaced one second apart with the pulses applied to power interrupting circuits 42 and 43 being delayed 550 milliseconds from the pulse applied to power interrupting circuit 41.

Power interrupting circuit 41 will now be described in detail. It will be understood that power interrupting circuits 42 and 43 operate in identical manner except that their output is delayed, as shown by the wave form 28 in FIG. 3. Each power interrupting circuit includes 250 millisecond monostable multivibrator 55, a zero voltage or cross over circuit 56, and a power handling circuit 57. Input power from the aircraft is carried by line 58 through the power handling circuit 57, which includes gate controlled rectifiers SCR1 and SCR2, diodes D4 and D5, and through a radio frequency interference filter 60 to output terminals 34 and 35. As described herein, the power interrupting circuit 41 controls the operation of the body mounted anti-collision lamps 19 and 20 while power interrupting circuits 42 and 43 control the operation of the wing tip mounted flash lamps.

Aircraft power will be transferred through the power handling circuit 57 until a pulse from timing circuit 40 is detected by the 250 millisecond monostable multivibrator 55 at which time the gating voltage to SCR1 and SCR2 will be removed. At the end of a 250 millisecond delay, SCR1 and SCR2 will be gated on to restore power to the output terminals.

It may thus be seen that power to the terminals is interrupted for 250 milliseconds providing the timer 40 is operating, and that this power is interrupted once each second. By providing power interrupting circuits for each set of lamps, each circuit will operate independently and will be unaffected by the operation of the other circuits.

Figure 5:
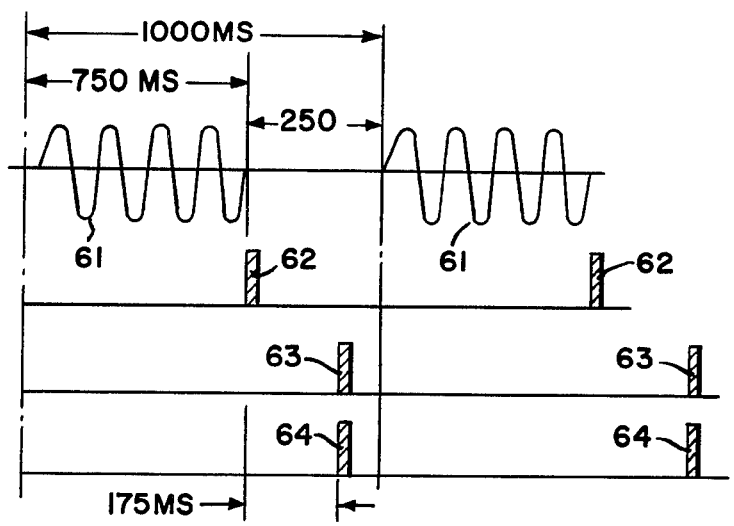
FIG. 5 is a set of wave forms showing the relationship between the power input to the controlling circuit and the trigger pulses supplied by the controlling circuit to the various flash lamps.

The outputs of the power interrupting circuits 42 and 43 are carried by cables 32 and 33 to controlling circuit means 30 and 31, respectively, each located near the flash lamps mounted on the wing tips of the aircraft. Each controlling circuit 30 and 31 includes a power sensing circuit, a time delay circut, a trigger pulse circuit, and a high voltage supply circuit. In FIG. 5, the wave form 61 represents the voltage carried by cable 32 to the controlling circuit 30 and wave forms 62, 63 and 64 represent the trigger pulse output of the controlling circuit to the flash lamps.

Figure 6:
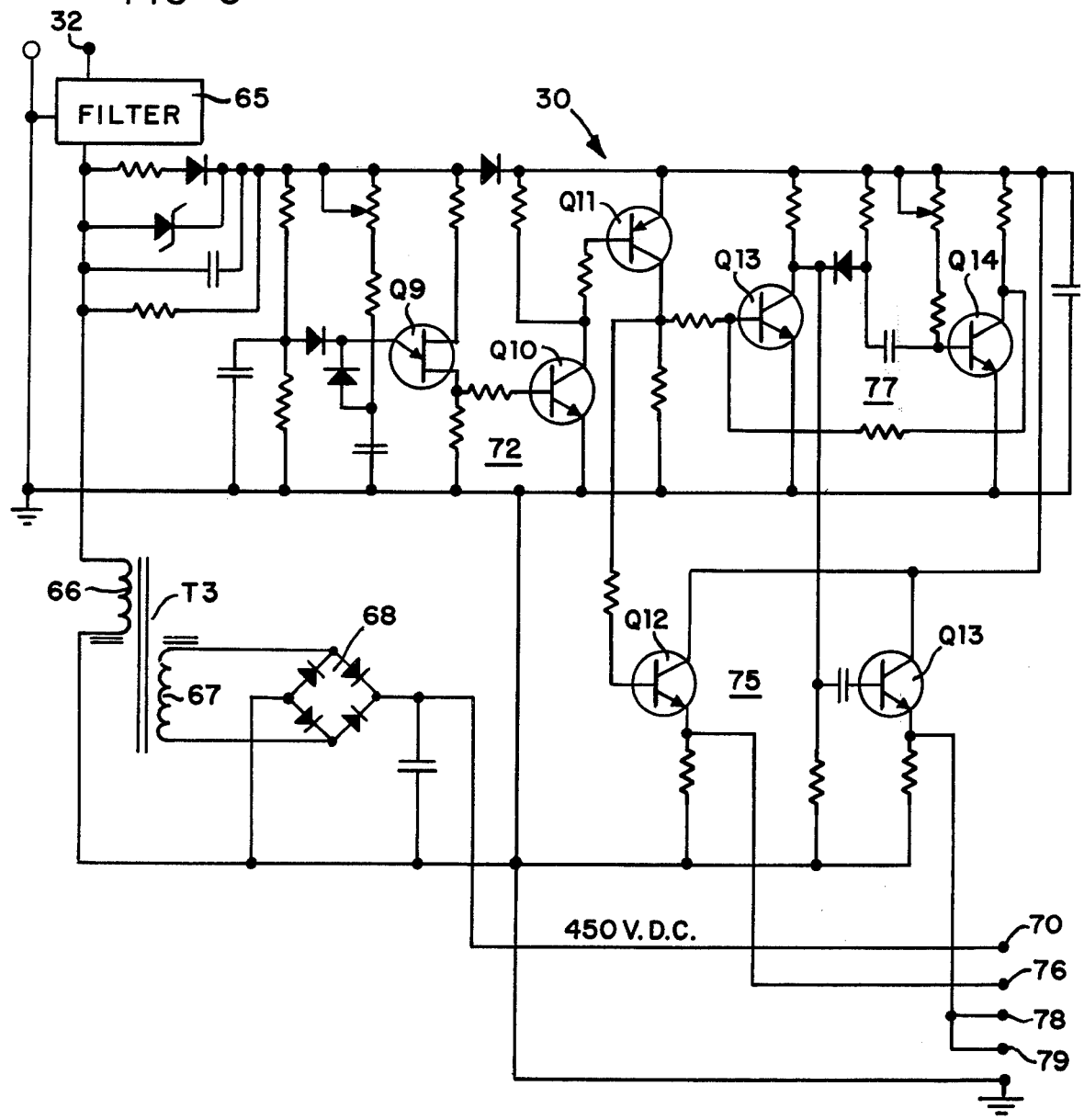
FIG. 6 is a detailed electrical schematic diagram of the controlling circuit.

Referring now to FIG. 6 which is an electrical schematic diagram of the controlling circuit 30, the 115 volt, 400 Hz input from the power interrupting circuit which is carried by cable 32 is applied through radio frequency interference filter 65 to the primary winding 66 of power transformer T3. The secondary winding 67 of this transformer is connected to a full wave bridge rectifier 68, and the output of this rectifier, which is 450 volts DC, is applied to output terminal 70 and then to each of the flash lamps 12, 13 and 17 mounted on the left wing tip.

The output from the filter 65 is also applied to a power sensing circuit 72 which includes unijunction transistor Q9 and transistors Q10 and Q11. Unijunction transistor Q9 functions as an oscillator having a period of oscillation in excess of one second. Since the power input on cable 32 is interrupted prior to the expiration of this one second delay, the voltage on the base of the unijunction will begin to drop, fire the transistor and cause transistor Q12 in the trigger pulse circuit 75 to generate a trigger pulse on output terminal 76. This corresponds to pulse 62 in FIG. 5.

The output of the power sensing circuit 72 is also applied to time delay circuit 77 which includes transistors Q13 and Q14. This circuit is a monostable multivibrator having a time period of 175 milliseconds. At the end of this period, transistor Q13 in the trigger pulse circuit will apply an ouput on lines 78 and 79 corresponding to trigger pulses 63 and 64 in FIG. 5.

In the embodiment described herein, output terminal 76 is connected to one of the forward facing lamps 12 while output terminal 78 is connected to the remaining forward facing lamps 13 and output terminal 79 is connected to the rearward facing lamp 17. Thus, the rearward facing lamp and one of the forward facing lamps will be triggered simultaneously, while the other forward facing lamp is triggered within 175 milliseconds. It will be understood that while lamp 12 is described as being triggered first, it could also be triggered after the other two wing tip lamps.

Referring again to FIG. 6, in the event that power is continuously applied on line 32 and is not interrupted by the trigger circuit 25, the power sensing circuit 72 will nevertheless generate the necessary trigger pulses due to the operation of unijunction transistor Q9. Under these conditions, the lamps on one wing tip will fire properly, that is the forward facing lamps will fire within 175 milliseconds of each other and the rearward facing lamp will fire simultaneously with one of the forward facing lamps. The wing tip lamps on both wings, however, may not fire in synchronism due to the independent operation of the controllers 30 and 31.

Figure 7:
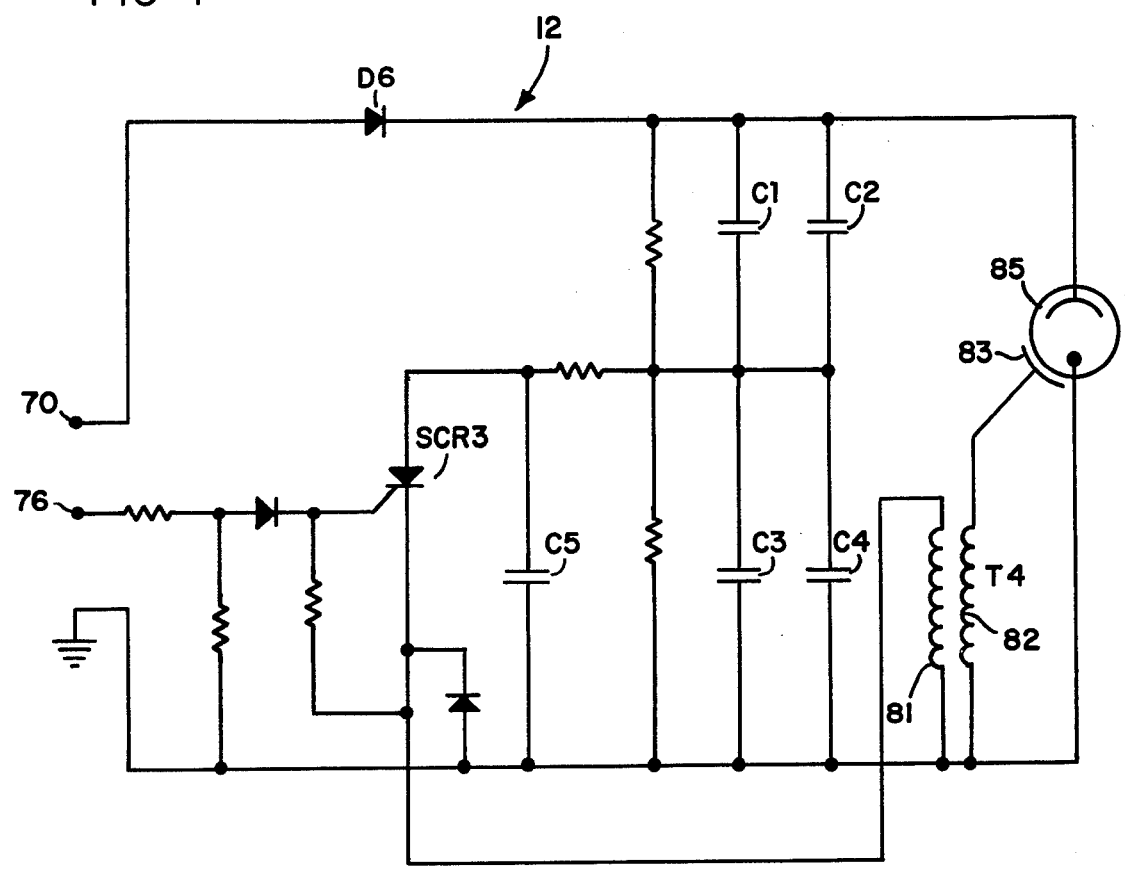
FIG. 7 is an electrical schematic diagram of the flash lamp triggering and energy storing circuit.

Referring now to FIG. 7 which is an electrical schematic diagram of lamp assembly 12, 450 volts DC is applied on terminal 70 and through diode D6 to capacitors C1, C2, C3 and C4. The diode D1 prevents the energy which is stored on these capacitors from discharging through the controlling circuit 30 to the other lamp assemblies 13 and 17.

When a trigger pulse is applied to the trigger terminal 76, SCR3 fires and discharges the energy stored in capacitor C5 through the primary winding 81 of the trigger transformer T4. This develops a high energy pulse in the secondary winding 82 which when applied to the trigger electrode 83 of flash tube 85 ignites the tube and causes the energy stored in capacitors C2 – C5 to dissipate into the form of light energy.

The controlling assemblies for the upper and lower anti-collision lights are similar to the ones just described in that the energy stored in capacitors is discharged through the lamp by a trigger signal which is initiated upon the interruption of power to the lamp assembly. Of course, no time delay circuit is included since only a single upper and a single lower anti-collision lamp are provided.

The invention thus described provides a unique and easily recognizable double flash of light as observed from the forward part of the aircraft to identify the approach of the aircraft, while a single flash from each wing tip is provided and may be viewed from the rear of the aircraft.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An attention-arresting aircraft stroboscopic lighting system providing recognition of the relative position of an aircraft in flight to enable a pilot in an observing aircraft to determine quickly whether a possible collision condition exists, comprising forwardly-directed high-intensity flash lamp means on said aircraft, rearwardly-directed high-intensity flash lamp means on said aircraft, said lamp means each being of the same color and being oriented with respect to said aircraft to cover an azimuth field of approximately 360°, circuit means connected to said flash lamp means, said circuit means flashing said forwardly-directed flash lamp means with distinct closely-spaced pairs of flashes at a given rate and flashing said rearwardly-directed flash lamp means with single flashes substantially at said rate, the interval between the flashes of said pairs of flashes being sufficiently short so as to provide the appearance of a distinctive double flash without merging as a single flash, the periodic interval between said pairs of flashes being substantially longer than said interval between individual flashes of said pairs so as to provide for instant recognition of said forwardly-directed flash pairs from said rearwardly-directed single flashes.

2. The system of claim 1 in which said forwardly-directed flash lamp means comprises a pair of individual flash lamps, and in which said circuit means flashes one lamp of said pair with a short time delay following the flashing of the other lamp of said pair providing said flash pairs.

3. The system of claim 2 in which said forwardly and rearwardly directed flash lamp means are visible together when said aircraft is viewed from the side, and in which one of said forwardly-directed flash lamps is flashed simultaneously with said rearwardly-directed flash lamp means.

4. The system of claim 2 in which said flash lamp means are mounted in the wing tips of said aircraft and in which said rearwardly-directed flash lamp means comprises a separate flash lamp in each wing tip and said forwardly-directed flash lamp means comprises a separate said pair of lamps in each said wing tip providing a visual indication of aircraft atitude as well as relative position.

5. The system of claim 1 in which said interval between said flash pairs is in the order of 175 milliseconds and in which said rate is in the order of one per second.

* * * * *